No. 821,739.
PATENTED MAY 29, 1906.
J. P. PRENTICE.
LANTERN AND PLUG FOR WATER TUBE BOILERS.
APPLICATION FILED SEPT. 11, 1905.
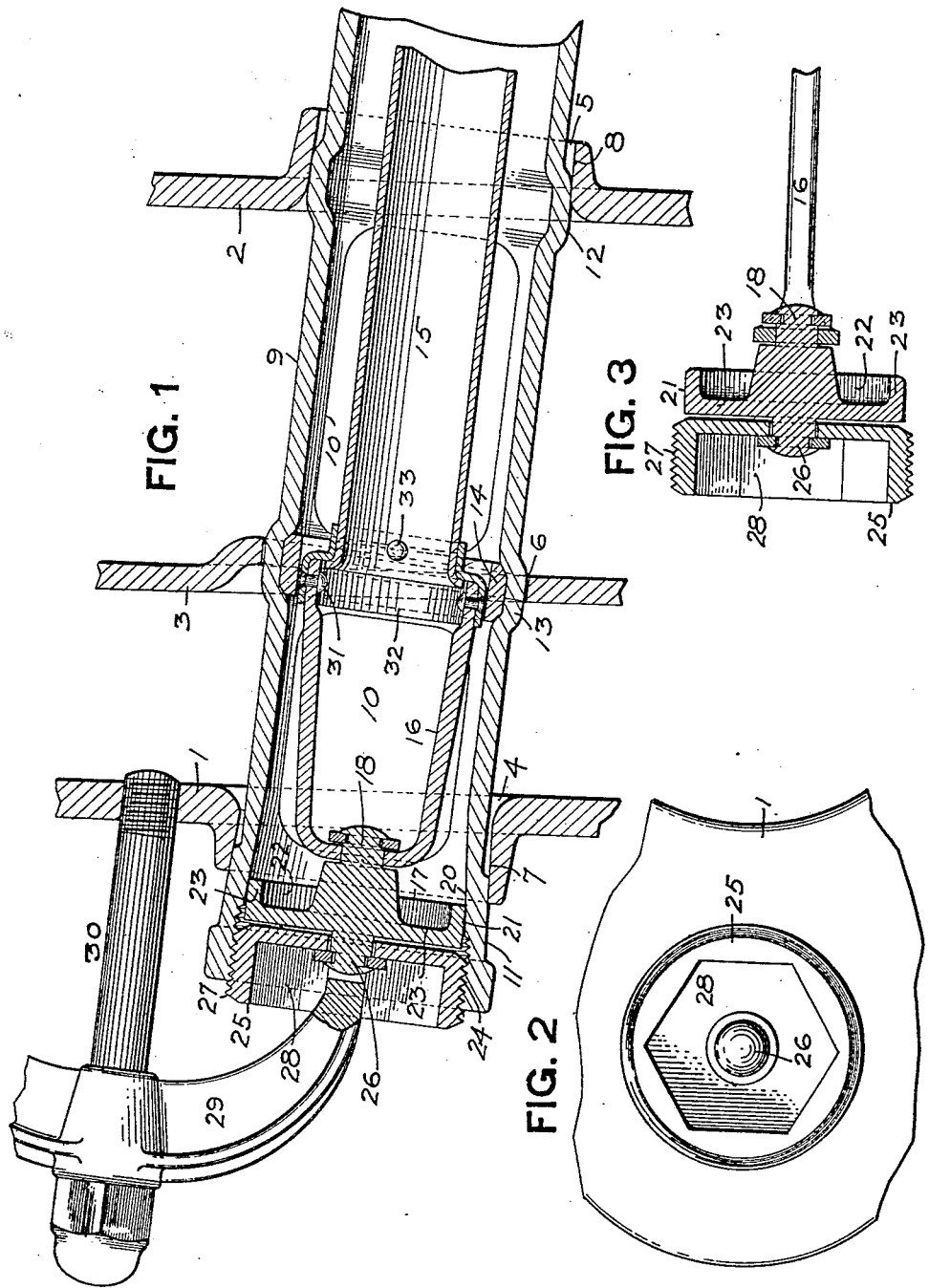
WITNESSES.
J. R. Keller
G. C. Raymond
INVENTOR.
John P. Prentice
By Kay, Totten & Winter
His Attys.

UNITED STATES PATENT OFFICE.

JOHN P. PRENTICE, OF BARBERTON, OHIO, ASSIGNOR TO THE STERLING COMPANY, A CORPORATION OF NEW JERSEY.

LANTERN AND PLUG FOR WATER-TUBE BOILERS.

No. 821,739.    Specification of Letters Patent.    Patented May 29, 1906.

Application filed September 11, 1905. Serial No. 277,951.

*To all whom it may concern:*

Be it known that I, JOHN P. PRENTICE, a resident of Barberton, in the county of Summit and State of Ohio, have invented a new and useful Improvement in Lanterns and Plugs for Water-Tube Boilers; and I do hereby declare the following to be a full, clear, and exact description thereof.

My invention relates to Niclausse and similar water-tube boilers, and more especially to the lantern and lantern-plug thereof. Its object is to provide an outer tube or lantern and lantern-plug therefor, so constructed that a perfectly-tight joint will be formed between the two, but nevertheless so that the plug can be easily taken out and replaced.

This application includes the invention disclosed in my application filed October 6, 1904, Serial No. 227,490, and in addition certain improvements thereon. In part it is a continuation of said prior application.

The well-known Niclausse water-tube boiler comprises a series of headers, each of which is provided with a diaphragm dividing the same into two longitudinal channels, one behind the other, which communicate at their upper ends with the steam and water drum. The front and rear walls of the header, together with the diaphragm, are provided with alining openings, and in these openings is located a skeleton frame or "lantern," as it is called, or the equivalent skeleton forward end of the outer tube, which forms a tight joint with and closes the openings in the header-walls. The outer tube is closed at its rear end, and in it is located the inner or circulating tube, having its rear end open and extending nearly to the rear closed end of the outer tube. The forward end of the inner circulating-tube extends into the lantern or skeleton forward end of the outer tube as far as the diaphragm and is there connected to a skeleton frame, which in turn is provided with or attached to a plug secured in a collar at the forward end of the outer tube or lantern.

My invention applies to this general construction of lantern and lantern-plug; and its object is to so construct those parts as to give an absolutely tight joint between the plug and lantern or outer tube, but which nevertheless will permit the plug to be easily taken out or replaced.

The invention consists, generally stated, in forming a conical seat on the inner surface at the forward end of the outside tube or lantern and providing the plug with a plain outer face, adapted to bear against this conical seat and form a tight joint therewith.
Swiveled to the plug is a nut, the outer face of which nut and inner face of the lantern or forward end of the outer tube are provided with coöperating screw-threads, so that the plug can be forced inwardly against the conical seat in the lantern or outer tube and held in such close engagement therewith as to make an absolutely water and steam tight joint. The coöperating screw-threads are located entirely in front or outside of the water and steam tight joint, and consequently are not affected by the steam and water and will not readily rust. As a result the plug is easy of removal or replacement.

The invention also consists in details of construction hereinafter described and claimed.

In the accompanying drawings, Figure 1 is a vertical section through a portion of the header, showing my improved lantern and lantern-plug therein. Fig. 2 is a front view of the lantern and lantern-plug, and Fig. 3 is a sectional view of the plug and nut.

The front wall of the header is shown at 1, the rear wall at 2, and the diaphragm at 3.
These are provided with the alining openings 4, 5, and 6, respectively. The openings 4 and 5 are provided with seats 7 and 8, respectively, which are slightly conical and taper from the front toward the rear. In these alining openings is placed a skeleton frame, ordinarily called a "lantern," to the rear end of which is attached the forward end of the outer tube 9 or what is the equivalent thereof. The forward end of said outer tube is cut away at 10 to form a skeleton forward end, which takes the place of the usual lantern. The latter construction is shown in the drawings.

The skeleton end of the outer tube or the equivalent lantern at its forward end is provided with a collar 11, having a tight fit with the seat 7 in the front wall of the header and also with a rear collar or enlargement 12, having a tight fit with the seat 8. At the diaphragm 3 the outer tube or lantern also is slightly enlarged, as at 13, so as to fit closely in the opening 6 in the diaphragm, although not necessarily making a tight fit therewith. It is provided with a reinforcing-ring 14 in this enlarged portion.

Inside of the tube 9 is the inner or circulating tube 15, which extends into the header and lantern as far as the diaphragm 3. At this point it is connected to another skeleton frame 16, which at its forward end is provided with or attached to the plug 17. The latter may, if desired, be an integral portion of the frame 16; but it is preferred to make the same separate therefrom, as shown, and to attach the same to said frame by means of a swivel connection 18, so that the plug can rotate independently of the frame and inner circulating-tube.

All of the parts—viz., the header, the inner and outer tubes, the lantern or skeleton forward end of the outer tube, and the plug—except the reinforcing-ring 14 are or may be of the usual or any desired construction. These parts will differ from those usually employed in the particulars now to be described.

Formed on the inner face of the forward collar 11 of the outer tube or lantern is a seat 20, which is slightly conical, as shown, and tapered toward the rear. The plug 7 is provided with a plain outer face 21, which bears against the conical seat 20 when the plug is forced inwardly. This face 21 of the plug preferably is a cylinder or formed on a taper less than the conical seat 20, so that the inner end only of the face 21 will bear against the conical seat 20, thus insuring a perfectly tight joint between the plug and seat 20 when the former is forced inwardly into engagement with the latter. To still further insure an absolutely tight joint at this point, the plug is provided on its rear end face with a groove or recess 22 of a considerable depth and so located as to leave a comparatively thin annular wall or shell 23 surrounding the same. The steam and water pressure will enter the groove or recess 22 and expand the wall or shell 23 outwardly against the seat 20, and the greater the pressure in the header the tighter will the wall 23 be forced against the seat 20, thus insuring an absolutely tight joint at all pressures.

Formed on the inner face of the collar 11 of the outer tube or lantern and in front or outside of the conical seat 20 are screw-threads 24. A nut 25 is connected to the plug 17 by means of a swivel and formed on the outer face of the connection 26. This nut is in front or outside of the plug 17 and its face 21, and on its periphery are screw-threads 27, which coöperate with the threads 24 in the outer tube or lantern. The screw-threads 24 and 27 will be continuous uninterrupted standard threads of sufficient pitch and depth to form a secure holding means. The outer end of the plug 17 is provided with a polygonal socket 28 or other means for receiving a suitable tool by means of which said plug can be screwed into and out of the lantern or water-tube. By rotating said plug the screw-threads 24 and 27 act to move the plug inwardly and force the face 21 thereof tightly against the conical seat 20 in the lantern or outer tube, and thus form an absolutely water and steam tight joint at this point. As the screw-threads are entirely outside of this water-tight joint, moisture will have no access thereto, and as a consequence said threads will be comparatively free from rust, so that the plug can be easily taken out or replaced when desired. As this nut 25 is swiveled to the plug 17, the latter will not rotate or only slightly when being forced to its seat. In this way the wear of the seat and plug is avoided.

Any suitable means may be employed for holding the plug and lantern or outer tube in the header. I have shown for this purpose the usual yoke 29, bearing against the plug 17, and the bolt 30, by means of which said plug and lantern or outer tube can be forced inwardly into the header and form a tight joint at the seats 7 and 8 in the front and rear walls of the header.

The skeleton frame 16 may be connected to the forward end of the inner tube in any suitable way. As shown in the drawings, this skeleton frame 16 is a U-shaped strap swiveled at its base to the plug 17 and having the ends of its legs riveted at 31 to a cup-shaped member 32, suitably secured to the forward end of the inner tube 15, such as by having the forward end of said tube expanded in said cup-shaped member. As an additional securing means rivets 33 may be driven through the cup-shaped member and the forward end of the tube.

The manner of constructing the plug and other parts and of assembling and disassembling the same will be readily understood from the foregoing description. The connection between the plug and the outer tube or lantern is such that an absolutely water and steam tight joint is formed, one which will permit the ready removal and replacement of the plug when necessary and one in which the wear of the plug and its seat is largely overcome.

It will be understood that modifications in the construction can be made without departing from the spirit of my invention. For instance, instead of having the forward end of the outer tube formed as a skeleton to provide the lantern a separate skeleton member or lantern may be employed extendng back as far as the rear wall of the header and having the outer tube there connected to the same.

What I claim is—

1. In a water-tube boiler, the combination of an outer tube or lantern provided with a seat on its inner face, a plug having a face arranged to bear against said seat, and a nut connected to said plug and having threads on its outer face adapted to coöperate with threads on the inner face of the outer tube or lantern in front of its seat.

2. In a water-tube boiler, the combination of an outer tube or lantern provided with a seat on its inner face, a plug having a face arranged to bear against said seat, and a nut located in front of said plug and having threads on its outer face adapted to coöperate with threads on the inner face of the outer tube or lantern in front of its seat.

3. In a water-tube boiler, the combination of an outer tube or lantern provided with a seat on its inner face, a plug having a face arranged to bear against said seat, a member swiveled to said plug on its outer side, and spirally-arranged coöperating connecting means on said member and outer tube and lantern.

4. In a water-tube boiler, the combination of an outer tube or lantern provided with a seat on its inner face, a plug having a face arranged to bear against said seat, a nut swiveled to said plug, and coöperating threads on said nut and outer tube or lantern.

5. In a water-tube boiler, the combination of an outer tube or lantern provided with a conical seat on its inner face, a plug provided with a face of less taper than said seat and arranged to have its end bear against said seat, and coöperating continuous screw-threads formed on the outer face of said plug and inner face of the outer tube or lantern and located in front of the bearing-faces thereon and serving to force said plug inwardly and hold it in engagement with said conical seat, the threads on the outer tube or lantern running out to the end thereof.

6. In a water-tube boiler, the combination of an outer tube or lantern provided with a conical seat on its inner face, a plug having a groove or recess formed in its rear end face thus leaving an annular wall or shell surrounding the same, said plug being provided with a face of less taper than said seat and arranged to have its end bear against the conical seat in the outer tube or lantern, and coöperating continuous screw-threads formed on the outer face of said plug and the inner face of the outer tube or lantern and located in front of the bearing-faces thereon and serving to force said plug inwardly and hold it in engagement with the conical seat in the outer tube or lantern.

7. In a water-tube boiler, the combination of an outer tube or lantern provided with a conical seat on its inner face, a plug provided with swivel connections for having the inner circulating-tube connected thereto and provided with a face of less taper than said seat and arranged to have its end bear against the conical seat in the outer tube or lantern, and coöperating continuous screw-threads on said plug and outer tube or lantern and in front of the bearing-faces thereof and serving to force said plug inwardly and hold it in engagement with said conical seat, the thread in the outer tube or lantern running out to the end thereof.

8. In a water-tube boiler, the combination of an outer tube or lantern, an inner circulating-tube, a plug secured to the outer tube or lantern, a U-shaped skeleton frame attached at its base to said plug and having the ends of its legs riveted to the forward end of the inner tube.

9. In a water-tube boiler, the combination of an outer tube or lantern, an inner circulating-tube, a cup-shaped member secured to the forward end of said inner tube, a plug secured in the lantern or outer tube, a U-shaped skeleton frame having its base secured to said plug and having the ends of its legs riveted to the cup-shaped member on the forward end of the inner tube.

10. An outer tube for water-tube boilers having an expanded portion and a reinforcing-ring therein.

11. A plug for water-tube boilers comprising a body provided with a seating-face, and a member swiveled to the body and provided with means for engaging the tube or lantern.

12. A plug for water-tube boilers comprising a body provided with a seating-face, and a nut swiveled to said body.

In testimony whereof I, the said JOHN P. PRENTICE, have hereunto set my hand.

JOHN P. PRENTICE.

Witnesses:
J. E. BELL,
J C. FRANK.